US010102559B1

(12) United States Patent
Jain et al.

(10) Patent No.: US 10,102,559 B1
(45) Date of Patent: Oct. 16, 2018

(54) DIVERSIFICATION OF RECOMMENDATIONS

(71) Applicant: Amazon Technologies, Inc., Seattle, WA (US)

(72) Inventors: Sanjeev Jain, Redmond, WA (US); Brent Russell Smith, Redmond, WA (US); Alexandra Juliet Brasch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1015 days.

(21) Appl. No.: 14/502,557

(22) Filed: Sep. 30, 2014

(51) Int. Cl.
*G06Q 30/00* (2012.01)
*G06Q 30/06* (2012.01)
*G06Q 30/02* (2012.01)
*G06F 17/30* (2006.01)
*H04L 12/807* (2013.01)

(52) U.S. Cl.
CPC ..... *G06Q 30/0631* (2013.01); *G06F 17/3053* (2013.01); *G06Q 30/02* (2013.01); *H04L 47/27* (2013.01)

(58) Field of Classification Search
CPC ........................................................ G06F 17/30
See application file for complete search history.

(56) References Cited

U.S. PATENT DOCUMENTS 8,838,583 B1 * 9/2014 Fox .................... G06F 17/3053 707/723
2002/0019763 A1 * 2/2002 Linden .................. G06Q 30/02 705/14.53
2010/0268661 A1 * 10/2010 Levy ...................... G06Q 30/02 705/347
2012/0078887 A1 * 3/2012 Schuil ................. G06F 17/3053 707/723
2013/0179836 A1 * 7/2013 Han ...................... G06F 3/0482 715/810
2014/0046965 A1 * 2/2014 Tian .................. G06F 17/30648 707/749

(Continued)

OTHER PUBLICATIONS

Chen, Xiangru, Diversifying Product Search Results, 2011, Proceedings of the 34th International ACM SIGIR Conference on Research and Development in Information Retrieval, pp. 1093-1094 (Year: 2011).*

*Primary Examiner* — William J Allen
*Assistant Examiner* — Timothy J Kang
(74) *Attorney, Agent, or Firm* — Knobbe, Martens, Olson & Bear, LLP

(57) ABSTRACT

A recommendation system increases the diversity of item recommendations provided to a target user by using item similarity data to reorder a recommendation set of items complementary to a source item. In one embodiment, the complementary items in the recommendation set are ranked based on a relevance score that represents a degree of relevance to the source item. The ranked recommendation set is then reordered based on overlap scores that represent degrees of similarity between particular items so that adjacent items and/or groups of items have less than a threshold degree of similarity. The overlap scores may be generated based on an automated comparison of user item viewing behavior, item attributes, item content, or based on another measure of item similarity.

24 Claims, 6 Drawing Sheets

(56) References Cited

U.S. PATENT DOCUMENTS

| | | | | |
|---|---|---|---|---|
| 2014/0229307 | A1* | 8/2014 | Kallumadi | G06Q 30/0601 705/26.1 |
| 2016/0012511 | A1* | 1/2016 | Braziunas | G06Q 30/0631 705/14.53 |

* cited by examiner

DIVERSIFICATION OF RECOMMENDATIONS

BACKGROUND

A computer-based recommendation service algorithmically selects items, e.g., goods (physical and/or digital) and/or services, to recommend to users. One common application for recommendation services involves recommending items for purchase, rental, subscription, viewing, or some other form of consumption. For example, some e-commerce sites provide services for recommending item to users based wholly or partly on the ratings assigned by the users to particular items. The recommendations may additionally or alternatively be based on the users' order histories, purchase histories, rental histories, item viewing histories, item tagging activities, and/or other behavioral profiles. Recommendation services are also commonly used to recommend web sites, news articles, music and video files, television shows, restaurants, and other types of items.

Some recommendation services present users with lists of items that are related to the item they are currently viewing. These lists may be based on aggregated purchase histories or item viewing histories of users, and are typically presented on catalog pages of an electronic catalog. For example, when a user accesses the item detail page for a particular item, the user may be presented with a list of items frequently purchased by those who purchase this item, and/or with a list of items frequently viewed by those who view this item. These lists assist users in identifying additional items that are complementary to, or are substitutes for, the item being viewed.

BRIEF DESCRIPTION OF THE DRAWINGS

Specific embodiments and inventive features will now be described with reference to the drawings, which are provided for purposes of illustration, and not limitation.

DETAILED DESCRIPTION

Figure 1A:
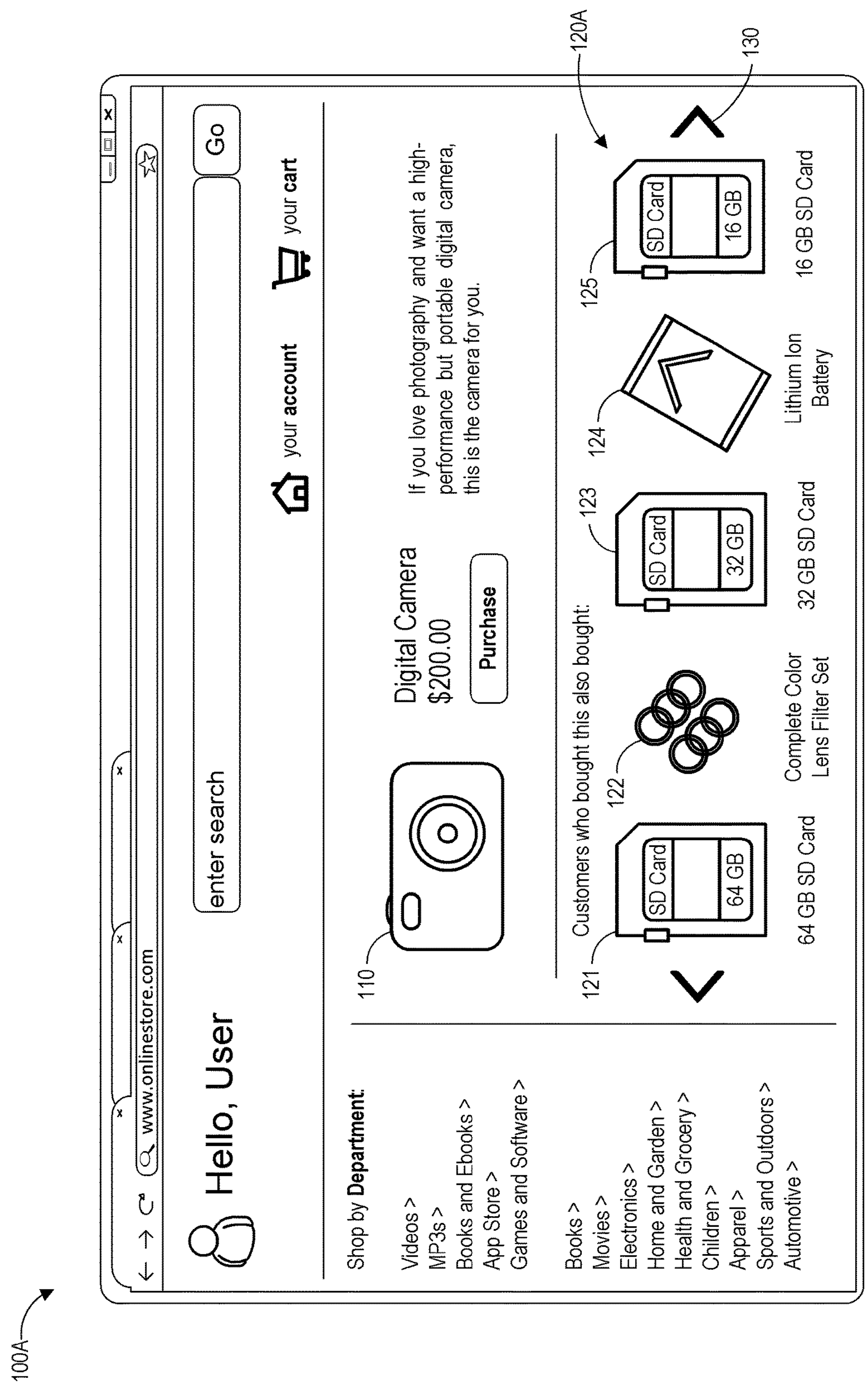
FIGS. 1A-1B illustrate embodiments of a user interface that presents a user with diversified item recommendations.

Developers of electronic commerce ("e-commerce") sites and systems often attempt to streamline the user experience by using recommendation services to provide users with content, including recommendations (personalized and general) of items available from an electronic catalog. A recommendation may be based on, for example, item relationships indicating items that the system determines that a user may wish to view or purchase based on the item viewing history or purchase history of the user.

These item relationships are determined by analyzing user purchase histories, product viewing histories, and/or other types of recorded behavioral data reflecting users' interests in particular items. See, e.g., commonly-owned U.S. Pat. No. 7,685,074, the disclosure of which is hereby incorporated by reference. This process may be repeated periodically (e.g., once per day or once per week) to incorporate the latest browsing activities of users. The resulting item-to-item association mappings may be used to provide item recommendations to users in various contexts. For example, the item-to-item mappings may be used to supplement product detail pages of an electronic catalog with lists of related items, and/or may be used to generate personalized recommendations for particular users.

Some recommendation systems generate and use directional item-to-item association mappings. For example, if users who purchase item A tend to purchase item B at a later date, the directional mapping A→B may be created. This mapping may, for example, be used as a basis for recommending item B to users who view, purchase, favorably rate, or otherwise exhibit an interest in, item A. (In this example, item A is the "recommendation source item," or simply "recommendation source," since it serves as the source or basis for recommending item B.)

Purchase-history-based related items typically represent complementary items commonly purchased together with an item under consideration, while view-history-based related items typically represent similar alternatives or substitutes explored by users. When a list of purchase-history-based related items is presented on an item detail page or elsewhere, the related items are typically listed in a ranked order in which the ranking is based on the degree of purchase-based similarity to the reference item. Typically, only the top-ranked few items (e.g. 5) are displayed, and the user is given the option to scroll through the list to see lower-ranked items. One problem with this approach is that the related items presented to the user (especially if the user does not scroll through the list) are often of the same type. For example, when a user views a catalog page for a digital camera, some or all of the top-ranked items in the "customers who bought this also bought" list may be memory cards. This can impede users' ability to discover other types of complementary items.

The foregoing and other problems are addressed, in some embodiments, by reordering, or otherwise modifying, the purchase-history-based related items lists based partly or wholly on item relationships derived from users' item viewing histories. For example, a purchase-history-based related items list may be reordered (or otherwise modified) such that items that are commonly viewed within the same browsing (or are otherwise commonly viewed in close proximity to each other) do not appear together in the list. This increases the likelihood that the user will be presented a relatively wide range of items that are complementary to the item being viewed. In some embodiments, the purchase-history-based related items lists may additionally or alternatively be reordered or otherwise modified based on other measures of item similarity, such as a measure that is based on a comparison of item attributes (e.g., category, brand, keywords, etc.). The disclosed methods may also be used to reorder or otherwise modify other types of recommendation lists, such as personalized recommendation lists that are generated based on user profiles.

Complementary items may be identified in one example from purchase histories (e.g., items indicated by user purchase histories as being purchased together with a source item relatively frequently). Similar or substitute items may be identified in one example from item viewing histories (e.g., items indicated by user viewing histories as being viewed in a same browsing session, within a predetermined time interval, within a predetermined number of viewing events, and the like). Similar or substitute items may be identified in another example based on sharing more than a threshold number of attributes, for example based on analysis of description keywords, category, title, user-provided feedback that the items are substitutes for one another, and the like. The diversification process can generate and use an overlap score representing a level of similarity between similar items to reorder a list of complementary items such that adjacent items in the list have similarity scores below a threshold. The overlap score can be based on viewing similarities (e.g., user browsing behavior and item viewing events) and/or attribute similarities. In some examples, the diversification process can be used to generate diverse groupings of two or more items, for instance generating a list of items for recommendation to a user wherein all items displayed within a presentation area are diverse from one another.

Accordingly, the present disclosure provides a recommendation system and associated user interface that presents users with diverse complementary item recommendations during browsing of an electronic catalog by the user. For example, when the user is viewing a content page (e.g., a product detail page) used to convey information about a source product, the system can either generate or retrieve a pre-generated diverse list of complementary items for presentation to the user.

The diverse complementary item recommendations service and associated user interface may be used with any type of interactive system (such as a web site, a mobile application based system, or an interactive television system) that generates item recommendations for users. For example, the user interface may be part of an interactive system that provides functionality for users to purchase, rent, download, and/or stream items selected from an electronic catalog. The items may, for example, include physical items that are shipped to users, digital items (e.g., music tracks, electronic books, videos, mobile applications, etc.) that are transmitted to users' computing devices, or a combination thereof. Complementary items included in recommendation sets can include items typically purchased with a source item (e.g., a memory card and spare battery for a source camera), items that are enjoyed with a source item (e.g., appetizers, beverage pairings, and desserts for a source recipe), and the like. It can be useful to present a user with a diverse set of such complementary item recommendations rather than a set containing many variations of the same type of item. In addition to use for presenting diversified complementary items, the user interface may also be used in systems that present diverse groupings of various other types of items to users, such as other recommended lists of the electronic catalog items, as well as food delivery services, event ticket vending systems, entertainment event services, vacation booking services, and other systems.

As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

FIG. 1A illustrates one embodiment of a user interface for providing diverse item recommendations, and more specifically, illustrates a source item content page 100A including a source item 110, a diversified list 120A of recommended items 121, 122, 123, 124, and 125 that are complementary to (e.g., purchased together with) source item 110. (As explained below, the diversified lists 120A and 120B shown in FIGS. 1A and 1B, respectively, are generated by reordering the related items list shown in FIG. 1C.) In the example of FIG. 1A, pairs of diverse items are presented together by re-ordering a list of ranked relevant items using a "diversity window" having a size of 2. A diversity window reflects a determined size of diverse item groupings. For example, picturing a window having a size of two items positioned over the recommended list 120A, as the window slides over the list exposing each possible pair of items, each pair will be diverse (e.g., contain two items that are below a threshold of similarity to one another). Two is the minimum size for a diversity window, reflecting a high priority on presenting relevant items with a minimum impact of item diversification. Diversity window size can be increased to present larger groups of diverse items at the expense of potentially moving more relevant items down the list, thereby exposing more diverse items but not necessarily the most relevant items. Accordingly, the size of the diversity window reflects a trade-off between item relevance and list diversity, and can be adjusted based on design considerations of a particular implementing system. In some embodiments, optimization of this trade-off can be based on an analysis of user behaviors, for example by exposing groups of users to the same list of recommended items that has been re-ordered into various diversified lists using diversity windows of different sizes and then analyzing interactions of the groups of users with the diversified lists, for instance to determine a diversity window size resulting in a largest number of average user selection of items from the diversified list.

In the illustrated embodiment, similar items are not displayed adjacent to one another. Memory cards 121, 123, and 125 are one example of variations of items that are highly similar, since these items are all memory cards but vary according to storage capacity. As such, users may be unlikely to purchase all three memory cards 121, 123, and 125 together, though the user may desire to purchase a memory card together with the camera source item 110. Therefore, the diversification techniques described herein can be used to ensure that such similar items are not displayed adjacent to one another, but instead are displayed adjacent to dissimilar items. Displayed adjacent to memory cards 121 are a lens filter set 122 and a camera battery 124. Accordingly, the user is not presented with any groupings of similar items, but rather a list where each recommended complementary item is displayed adjacent to a different type of recommended complementary item. In some embodiments, a higher degree of diversification can be achieved by ensuring that each of the initially-displayed complementary items (five in this example) is dissimilar from every such item.

Figure 1B:
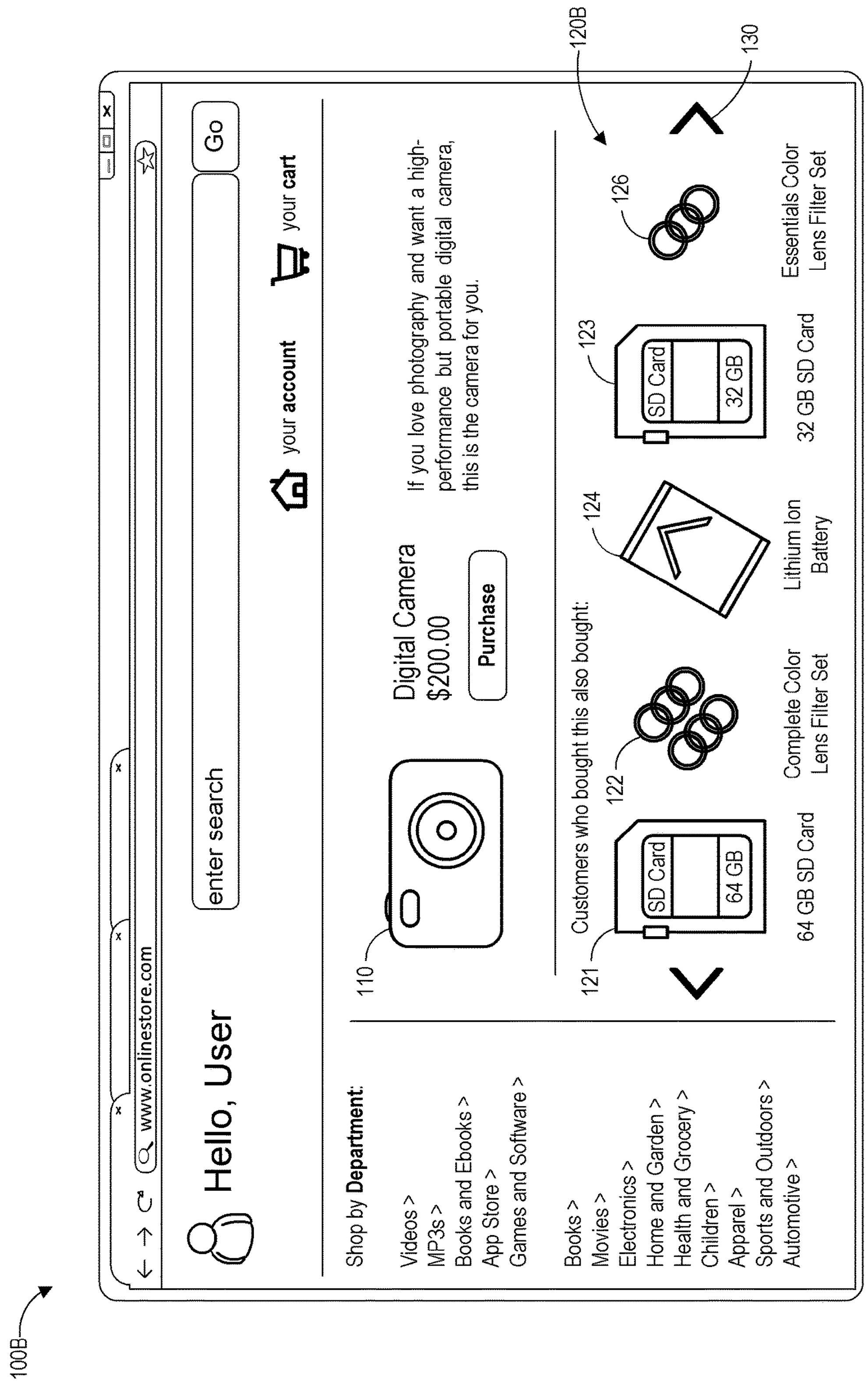

FIG. 1B illustrates another embodiment in which the diversified list 120B is generated to include diversified triplets. A first group of diversified triplets includes memory card 121, lens filters 122, and battery 124. A second group includes two initial items lens filters 122 and battery 124, and the two initial items are used to determine a diverse third item memory card 123. A third group includes two initial items battery 124 and memory card 123 which are used to determine a third diverse item lens filter 126. As apparent from the illustration, the diversification techniques described herein can be used to select groups of three diverse items, the group including two items used to identify a third item diverse to the two items. Therefore, in the example of FIG.

1B, the diversity window size is equal to three. For example, picturing a window having a size of three items positioned over the recommended list 120B, as the window slides over the list exposing each possible triplet of items, each triplet will be diverse (e.g., contain three items that are each below a threshold of similarity to one another). Although the groups illustrated in FIG. 1B are discussed as being generated using a sliding diversity window, thereby generating overlapping diverse triplet groups, in other embodiments the groups can be generated to be adjacent diverse groups.

In other examples the diversification techniques described herein can be used for selecting groupings of four or more items based on a determined diversity window size. Diversity window size can be a fixed, pre-determined number in some examples, and in other examples diversity window size can be dynamically determined based on known parameters of the display area for the diverse grouping of recommended items. Such parameters can include size of a display of a requesting user device, resolution of the display of the requesting user device, and/or a display area (e.g., a portion of) the user device display that will be used for presenting the diverse grouping of recommended items. Accordingly, the same user viewing the re-ranked recommended items list could be presented with different orderings when viewing from a smartphone of the user versus viewing from a laptop computer of the user. The size of the diversity window can be based in some examples on a number of item types or categories present in the ranked related items list such that a diversity window includes one item from each category or of each type. In some implementations, the size of the diversity window can be based on optimizing a trade-off between first presenting most relevant items and presenting diverse groupings of items.

The user interface 100B also includes navigation options 130 for allowing a user to scroll through the recommended items. Accordingly, in some examples, an entire list of recommended items can be maintained for presentation to the user while diversifying the list by re-ordering the items for display, and a user can navigate through portions of the display list to view the entire recommended set.

In other embodiments the diversified sets may each contain more or less than three items, such as two, four, five or six items. The size of the diversification groups may be selected dynamically based on the degree of diversity in the original list of complementary items. For example, if the original list consists primarily of items of four different types (e.g., lenses, batteries and memory cards), the system may select a set size of three. The list of recommended complementary items may be presented together with an indication of the basis (or bases) for the recommendation. The illustrated example for complementary items indicates that "Customers who bought this also bought:" however this is just one way of indicating to a user why the recommended items are being presented. For example, a list of other types of recommended items can be presented with a message such as "customers who viewed this also viewed," "because you previously viewed these items," "accessories for this items," "other popular photography items," or "customers who viewed this item ultimately bought." Though discussed in the context of complementary items, the diversification techniques can be used to diversify any presentation of recommended items where initially only a subset of the recommended items are presented. This can be useful for presenting a variety of items to a user in the initially-presented subset, as this initially-presented subset is presented to all users seeing the recommended items while any subsequently-presented subsets are presented only to users who navigate through the remainder of the list of recommended items.

Such diversified recommendations interfaces may be exposed to users in various contexts. For example, in the context of a shopping site, such an interface may be presented when a user views a content page associated with a source item. The user interface may thereby enable the user to rapidly determine a group of diverse complementary items for potential purchase with the source items. Diverse recommendations of non-complementary items can be presented to users at other times, for instance upon logging in to the shopping site, via email or other electronic messaging, or as advertisements when the user is visiting other web sites. Lists of non-complementary items (e.g., items that are not recommended for potential purchase together with a source item) can still benefit from being diversified based on view-based or attribute-based similarities as disclosed herein in order to present a user with a variety of choices.

The depicted page layout in user interfaces 110A and 110B is provided for illustrative purposes, and other user interface embodiments capable of providing complementary item recommendations or other types of item recommendations can include more or fewer sections, combined sections, different sections, other page element arrangements, and other interactivity options for enabling user interactivity. As will be recognized, the user interface may alternatively be implemented without using web pages. For example, the user interface may be implemented within a mobile application (such as a smartphone application), or within the native software of an e-book reader or a tablet computing device. In this particular example, the source item 110 is a representative example of any item available for electronic order and the recommended items 121, 122, 123, 124, 125, 126 are representative of various items that may be recommended to a user viewing the page of the source item 110. However, the diversification techniques presented herein are not limited to source items and recommended complementary items. In other examples, the diversification techniques can be used to generate diverse listings of recommended similar items to a source item. In further examples, the diversification techniques can be used to generate diverse listings of recommended items without a "source item," for example best-seller lists, listings of items available from a particular brand or merchant, items within a category, and the like.

Figure 1C:
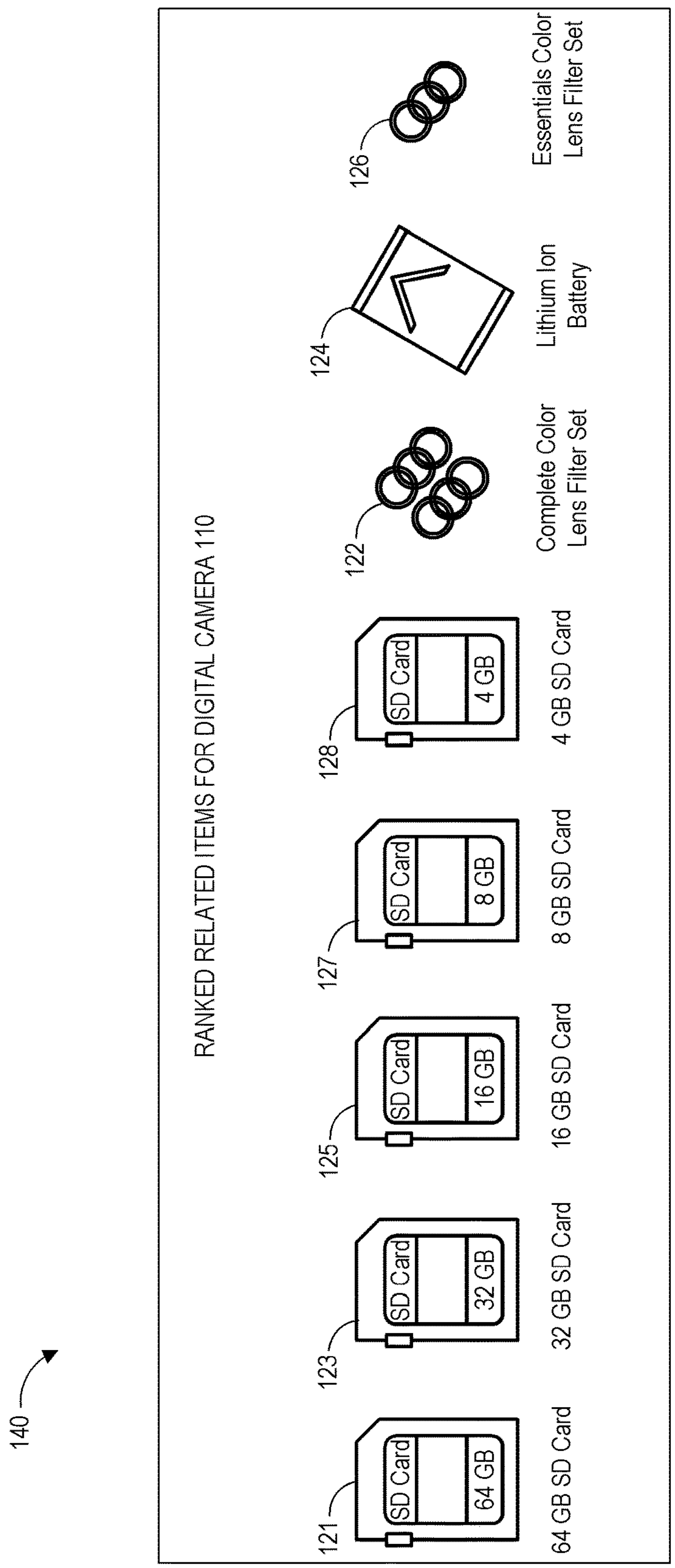
FIG. 1C illustrates one example of a list of complementary items for the viewed item in FIGS. 1A-1B.

FIG. 1C illustrates an example of ranked purchase history recommendations set 140 for source item 110 before the diversification techniques described herein were implemented to reorder the set 140. In this example, the recommended set 140 including items 121-127 is ranked according to purchase-based relatedness to the source item 110. The three memory cards 121, 123, and 125 are located together in the first three positions in the ranked list, followed by additional memory cards 127 and 128 or varying storage capacities, followed next by the lens set 122, battery 124, and second lens set 126. The grouping of the memory cards in the ranked recommendation set could cause presentation of only (or primarily) memory cards in an initial portion of the recommendations set, for example an initially-presented subset of the ranked list 140 presented in a small user interface (e.g., on a mobile device). Accordingly, by diversifying the list, a user is exposed to more types of complementary items for consideration. The additional memory cards 127 and 128 in the recommendations set 140 is not illustrated in FIG. 1A or 1B, however a user could select the navigation option 130 to change the displayed items and view the entire re-ordered recommended set. Though discussed primarily in the context of re-ordering entire lists of recommended items, in some embodiments, some recommended items may be filtered out based on similarity to other recommended items.

Figure 2:
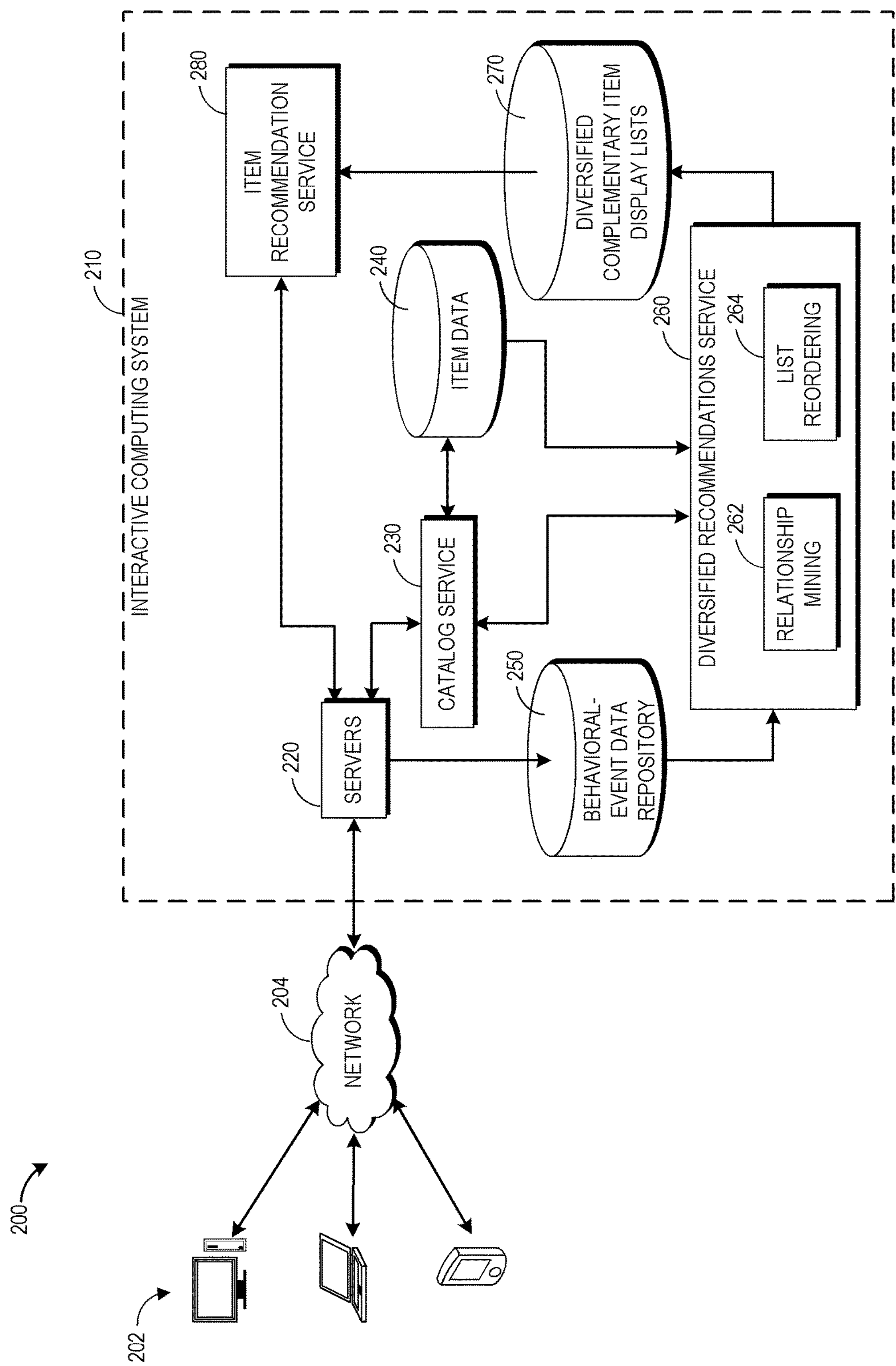
FIG. 2 a pictorial diagram depicting an illustrative embodiment of an operating environment in which an interactive computing system provides diversified item recommendations.

FIG. 2 illustrates one embodiment of an operating environment 200 including an interactive system 210 that can provide the above-described diversified item recommendation features. The system 210 can include a server 220 that provides network-based user access to an electronic catalog of items that are available for purchase, rental, download, and/or other transaction types. The server 220 may include multiple distinct server machines, such as web server machines. For purposes of illustration, it will be assumed that the system 210 hosts a network site that provides functionality for enabling users to acquire items represented in the catalog, although this need not be the case. The interactive system 210 may be accessed over a network 204 by users via one or more types of user computing devices 202, such as a laptop or tablet computer, personal computer, personal digital assistant (PDA), hybrid PDA/mobile phone, mobile phone, smartphone, global positioning system (GPS) device, electronic book reader, set top box, camera, audiobook player, digital media player, video game console, in-store kiosk, television, appliance, electronic device for inclusion in vehicles or machinery, gaming device, or the like. The network 204 may be any wired network, wireless network, or combination thereof (e.g., the Internet, a mobile communications network, and the like).

As is conventional, the electronic catalog may include, for each item available for acquisition from the interactive computing system 210, data used to generate a network page that describes the item (also referred to as an item detail page) for each item, and data used to generate a hierarchical browse tree for browsing the items by item category. Information about the various items (item images, descriptions, prices, etc.) may be stored in an item data store 240 or other data repository. The server 220 may retrieve item data from the data store 240 via a catalog service 230 and populate network pages (e.g., web pages) with such item data. The various components for dynamically generating network pages, including pages with diversified item recommendations of the type shown in FIGS. 1A and 1B, are represented by the item recommendation service 280 in FIG. 2. The item data store 240 may be embodied in hard disk drives, solid state memories, any other type of non-transitory computer-readable storage medium, and/or a file, a database, a relational database, stored in any such non-transitory computer-readable medium accessible to the catalog service 230. The item data store 240 may also be distributed or partitioned across multiple local and/or storage devices without departing from the spirit and scope of the present disclosure. For example, item data may be stored in different storage devices and/or accessed via different services. In some embodiments, the item data store 112 may implemented as a data storage web service.

As users browse the electronic catalog and perform various types of actions (such as viewing and purchasing items), the system 210 may record one or more types of item-related events in a behavioral event data repository 250. This data repository 250 may, in some implementations, include multiple distinct log files and/or databases. In some embodiments, the data repository 250 may be embodied in various types of computer-readable storage similar to the item data store 240. The recorded events may include, for example, item purchase events, item selection events, item viewing events (which may be based on visits to item detail pages), "shopping cart add" events, "wish list add" events, item rating events, and the like.

The recorded events or event histories may be analyzed periodically by a diversified recommendation service 260 to generate item to item associations and reordered lists of diversified recommended item sets, for example a diversified purchase-history-based recommendation set. Relationship mining service 262 may generate purchase-based related items list and viewing-based related item lists according to methods disclosed in U.S. Pat. No. 7,685,074, the entirety of which was incorporated by reference above. List reordering service 264 can receive pre-ranked recommendation sets in some examples and reorder lists of items in the recommendation sets to achieve a desired level of presentation diversity.

In one embodiment, the lists of diversified recommended item sets can be pre-generated, that is, generated in advance of a user requesting a content page including a user interface for displaying a recommendation set. In another embodiment, the lists of diversified recommended item sets can be generated partly or wholly in response to the user requesting a content page including a user interface for displaying a recommendation set. The request can include information regarding the user device, for example display size, browser or application type, and the like, such that a diversified list of recommended items can be generated dynamically in order to present the user with multiple groupings of diverse items one group at a time on the display. For example, if the display size is such that only three related items will initially be presented, a diversification method may be used that ensures that all three of the initially-displayed related items are dissimilar.

The diversified recommendation service 260 may generate or retrieve a ranked purchase-history-based recommended set for a source item from the data repository 250. The first item in the ranked recommended set can be set to a first position in a display list. The diversified recommendation service 260 can then generate an overlap score for each subsequent item in the ranked recommendation set (or a predetermined number N of subsequent items) representing a level of similarity with the first item and calculate a mean value of the overlap scores. The overlap score can be based on how often the two items are viewed in the same browsing session, other item viewing behaviors, based on attribute similarity, or other similarity measures. The diversified recommendation service 260 can then sequentially compare the overlap score associated with remaining items in the ranked recommended set to the mean overlap score in order to identify an item that is diverse from the first item. An overlap score of less than or equal to the mean score can indicate sufficient diversity in some embodiments. After the diversified recommendation service 260 identifies a diverse item (e.g., the first diverse item in the ranked list of relevant items), the item can be moved to a second position in the display list, re-ranking the other subsequent items after the diverse item. By sequentially scanning the ranked list, the diversified recommendation service 260 can diversify the recommended set while still substantially maintaining an order of items more relevant to less relevant to the source item.

After identifying a diverse item, the diversified recommendation service 260 can set the diverse item as a current item, calculate overlap scores for the subsequent items in the ranked recommendation set in comparison to the current item, calculate a mean overlap score, and perform sequential comparisons of overlap scores of each subsequent item with the mean score until another diverse item is identified. After the diversified recommendation service 260 identifies a diverse item, the item can be moved to a third position in the display list, re-ranking the other subsequent items after the diverse item. This process can be repeated until all of the items in the recommendation set have been positioned in the display list or until all remaining items are substantially similar. In some embodiments, where remaining items are determined to be substantially similar, the diversified recommendation service 260 may change a threshold for comparing overlap scores to the mean score for determining somewhat or slightly diverse items. When a complete diversified list has been generated, the diversified recommendation service 260 can store the list in association with the source item in the diversified complementary item display lists data store 270. By re-ranking such recommended sets, the system increases the diversity, and thus the utility, of the purchase-history-based recommendations ultimately presented to the target user.

The item recommendation service 280 may retrieve a diversified display list from the data store 270 for presentation to a user at a determined time or upon a determined event. For example, if a user requests an item detail page associated with a source item, the item recommendation service 280 can retrieve a display list stored in association with the source item. In some embodiments, multiple diversified display lists can be generated for storage in association with the source item including different sizes of diversified groups. A specific diversified display list can be retrieved based, for instance, on information regarding display size or browser type on the user device.

As will be recognized, the diversified item recommendations of the present disclosure can be used with other types of recommendation and personalization services, including recommendation services that do not use purchase-history-based item relationships. For example, complementary items can be determined in other manners, for example as specified by a seller of such items or as indicated by user-generated item groupings (e.g., wish lists, item collection lists, and the like). Thus, the invention is not limited to systems that use purchase histories as a basis for detecting and recommending complementary items.

Figure 3:
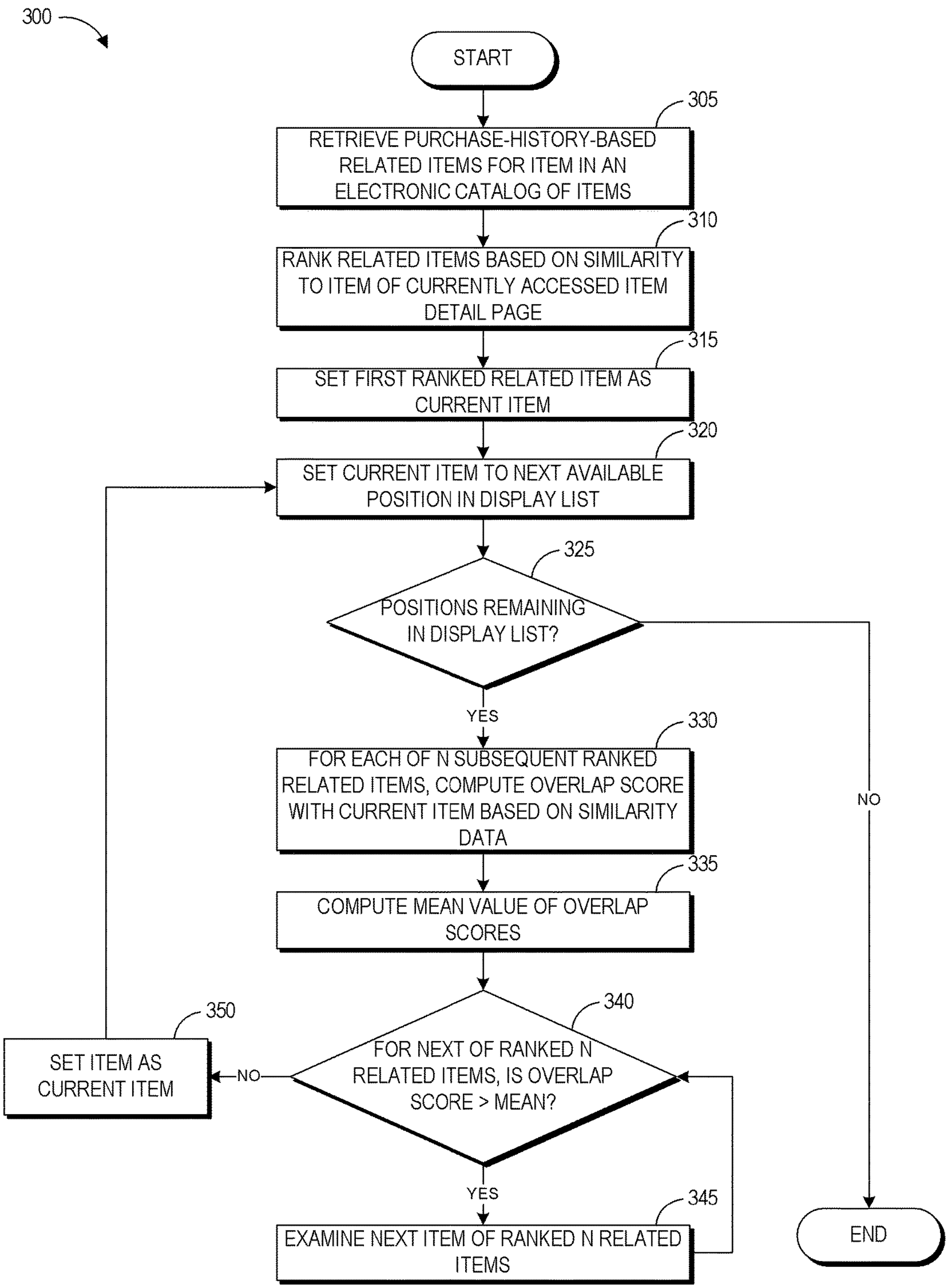
FIG. 3 is a flow diagram depicting an illustrative embodiment of a process that may be implemented by an interactive system, such as the system of FIG. 2, to diversify recommended items.

FIG. 3 illustrates an example of a recommended item list diversification process 300. The process 300 can be used to generate diverse item pairings, for example where a diversity window size is set to two. As described above, complementary items may be identified based on user purchase behavior with respect to an electronic catalog, and similar items may be identified based on user viewing behavior with respect to the electronic catalog and/or analysis of item attribute similarities. In addition to the illustrated example of using view-based item similarities to diversify recommendations based on purchase behavior, the process 300 can operate to diversify any type of recommended item set based on any type of item similarity data. Any of the computing devices or services shown in FIG. 2 can implement the process 300. For ease of illustration, however, the process 300 is described as being implemented by the interactive computing system 210, and in particular, the diversified recommendation service 260. The process 300 is discussed in the context of analyzing behavioral-event data of a population of users, and the population may be all users of the electronic catalog or a subset of the users. For example, a subset of users can be selected as a representative sample of the users of the electronic catalog, and in some embodiments multiple samples can be used to generate diversified display lists applicable to different types of users. One embodiment of the process 300 is illustrated in Appendix A.

At block 305, the diversified recommendation service 260 can retrieve a list of related items derived from an analysis of user purchase histories for a source item in the electronic catalog 230. In other embodiments, the diversification service can retrieve recommendation sets containing complementary items identified in other ways, for example complementary items as specified by a seller of such items or as indicated by user-generated item groupings (e.g., wish lists, item collection lists, and the like). In other embodiments, the process 300 can be used to diversify other types of recommendation sets where the items are not complementary items to a source item.

At block 310, the diversified recommendation service 260 can generate or retrieve pre-generated relevance scores indicating a degree to which a recommended item is complementary to the source item, and then can rank the recommended set of items based on a relevance score (e.g., most relevant item to least relevant item). By ranking based on relevance scores, the ranked recommended set can first present users with the item or items in which they would most likely be interested based on their interest in the source item. In some embodiments, recommended item sets may be pre-ranked and block 310 may be omitted. In one example, the ranked recommended related items can include a listing of items A, B, C, and D, where A is most relevant to the source item and D is least relevant to the source item.

At block 315, the diversified recommendation service 260 can set the first recommended item in the ranked list as a current item for use in determining a next diverse item. Considering the example of the ranked listing of items A, B, C, and D, item A would be set as the current item.

At block 320, the diversified recommendation service 260 can set the first recommended item in the ranked list to a first position in a display list. Considering the example of the ranked listing of items A, B, C, and D, item A would be set to the first position in the display list. The display list can be a separate list generated by selecting items from the ranked item listing in some embodiments, where the display list contains a number of display positions and is empty before block 320, being filled with diverse items according to the remainder of the process 300. In other embodiments, the display list can be the same list as the ranked item listing but with reordering applied according to the remainder of the process. The display list can be stored for presentation to a user accessing the source item.

At decision block 325, the diversified recommendation service 260 determines whether positions remain in the display list. This can involve determining whether there are any items remaining that require re-ordering in the ranked recommendation set or whether there are any open slots in a separately stored display list.

At block 330, for each of N subsequent items in the ranked recommendation set, the diversified recommendation service 260 computes an overlap score with the current item based on view-based similarity data and/or other item similarity data. Considering the example of the ranked listing of items A, B, C, and D, an overlap score can be computed between each of B, C, and D and item A, or between a predetermined number N of items B, C, and D and item A. The greater the number of items N in the ranked list that are considered for overlap scores, the greater the chance that the item eventually selected will be diverse to the current item.

In one embodiment an overlap score can be generated for items A and B based on retrieving a set of similar items associated with item A (for example, based on a number of items commonly viewed in a same browsing session as item A) and a set of similar items associated with item B, and then by determining a correlation (e.g., number of items in common) between the set of similar items associated with item A and the set of similar items associated with item B. In other embodiments, other item viewing behavior can be used to determine an overlap score between items A and B. In other embodiments, any of a variety of known methods for comparing item attributes or content may be used to generate the overlap scores. For example, techniques from natural language processing such as simple inter-document term frequency or more complicated algorithms such as latent semantic analysis may be used. Also, pattern recognition techniques such as neural networks or Bayesian belief networks operating over the content feature space may be used. The number N of subsequent items considered can be a user-defined parameter, can be a predetermined number based, for instance, on computing resource usage, or can be a dynamically determined number based, for example, on a number of remaining items in the recommendation set.

At block 335, the diversified recommendation service 260 uses the overlap scores to calculate a mean overlap score. Considering again the example of items A, B, C, and D, the overlap score associated with items B, C, and D can be 6, 7, and 2, respectively. Accordingly, the mean overlap score would be 5.

At decision block 340, the overlap score of each subsequent item in the ranked recommendation set is compared to the mean. This comparison can begin with the next item in the ranked recommendation set (e.g., the next most relevant item to the source item). Returning to the example of items A, B, C, and D, this would begin with a comparison of the overlap score of item B (the next-most relevant item after item A) to the mean.

If the overlap score of the item is greater than the mean, this indicates that the item is likely similar to the current item, and the process 300 transitions to block 345 to examine the next item in the ranked recommendation set, looping back to decision block 340. Returning to the example of items A, B, C, and D, the overlap score of B (6) is greater than the mean (5), so the process would move on to compare the overlap score of C (7) to the mean (5). Because the overlap score of C (7) is greater than the mean (5), the process would move on to compare the overlap score of D (2) to the mean. By sequentially scanning the ranked list, the diversified recommendation service 260 can diversify the recommended set while still substantially maintaining an order of items more relevant to less relevant to the source item. In an example where all overlap scores of the considered N items are the same, the mean will be equal to the overlap score of all of the considered N items, and therefore the first item will be selected as the diverse item.

If the overlap score of the item is equal to or less than the mean, this indicates that the item is likely diverse to the current item, and the process 300 transitions to block 350 to set the item as the current item for use in determining a next diverse item. The process 300 then loops back to block 320 to set (or re-order) the current item to the next available position in the display list and cycles back through the remaining process until no positions remain in the display list. Returning to the example of items A, B, C, and D, the overlap score of item D (2) is the first score that is less than the mean (5). This indicates that D is likely not similar to item A, and is the first item in the ranked list to satisfy this test, thereby being the most-relevant item that is also diverse to item A. Therefore, item D would be set to the next display position so that the display list order is "A, D, _, _" with a ranked list including just the remaining items "B, C" in the example of a separately stored display list, and "A, D|B, C" in the case of a single re-ordered list with the items to the left of the vertical line being fixed in their display position and the items to the right of the vertical line remaining in order according to the initial ranking and requiring diversification. Item D is then set to the current item for similarity comparison with items B and C. The process 300 will continue until all of items A, B, C, and D have been assigned to a separately stored display list or until all of the ranked list has been considered for reordering and is therefore finalized as the display list. When only a single item remains, the mean overlap score will be equal to the overlap score of the item, and therefore it will be selected to fill the last display position.

Accordingly, the process 300 can be used to generate display lists of recommended items wherein each recommended item is diverse to all adjacent items. In some embodiments, the process 300 can be used to pre-generate a number of such diverse display lists for storage in association with a source item, where each of the number of diverse display lists is generated using a different diversity window size, as discussed in more detail with respect to FIG. 4. In such embodiments, when a user requests a content page associated with the source item, a diverse display list can be selected based on having a diversity window size corresponding to a display size of the device of the user.

Figure 4:
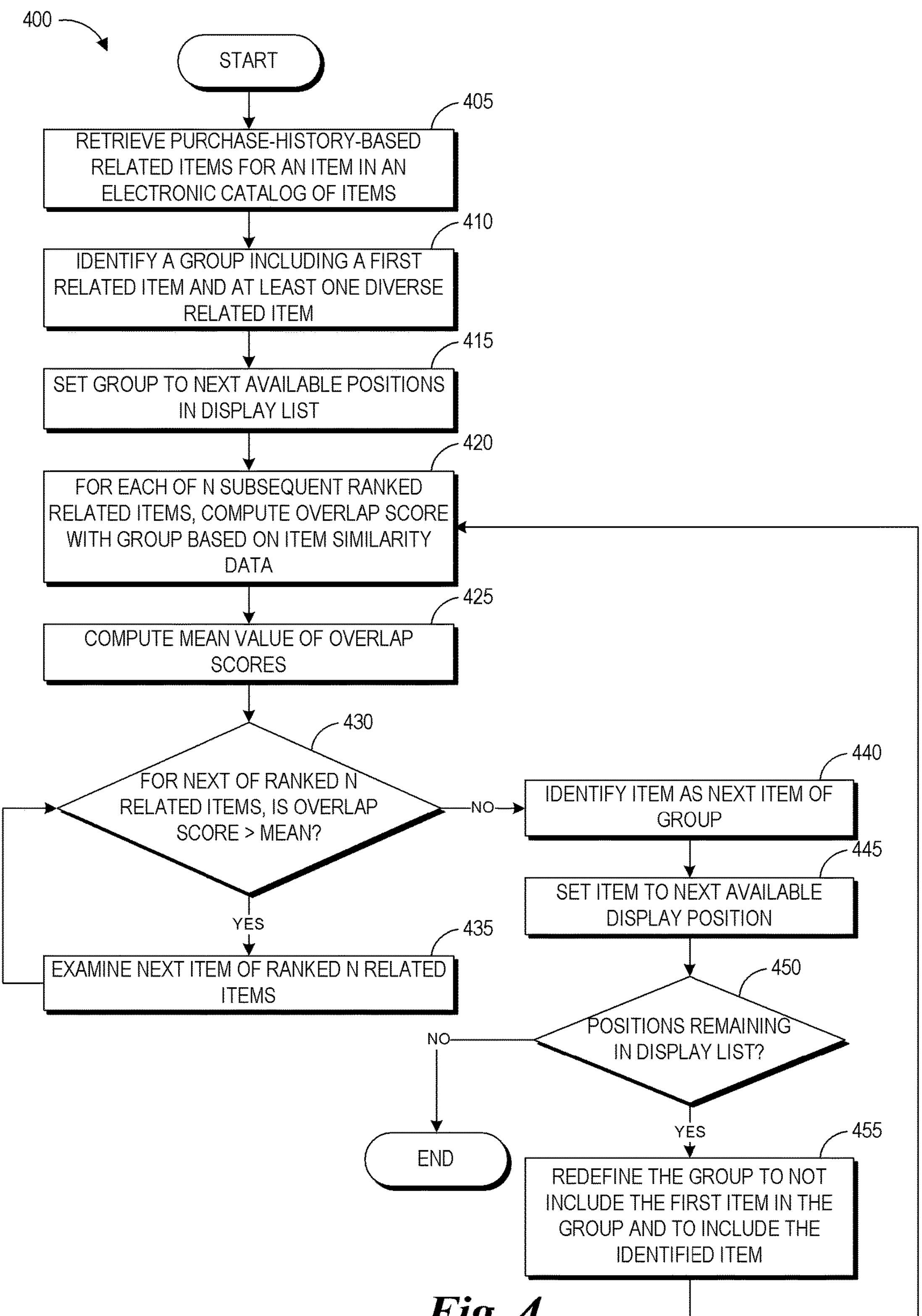
FIG. 4 is a flow diagram depicting another illustrative embodiment of a process that may be implemented by an interactive system, such as the system of FIG. 2, to diversify recommended items.

FIG. 4 illustrates another example of a recommended item list diversification process 400. The process 300 can be used to generate diverse item groupings, for example where a diversity window size is set to three or more. As described above, complementary items may be identified based on user purchase behavior with respect to an electronic catalog, and similar items may be identified based on user viewing behavior with respect to the electronic catalog and/or analysis of item attribute similarities. The process 400 can be used to generate diverse groupings of items for presentation to a user. Any of the computing devices or services shown in FIG. 2 can implement the process 400. For ease of illustration, however, the process 300 is described as being implemented by the interactive computing system 210, and in particular, the diversified recommendation service 260. One embodiment of the process 400 is illustrated in Appendix B.

At block 405, the diversified recommendation service 260 can retrieve a set of recommended items based on purchase-history-based item relationships for a source item in the electronic catalog 230. In other embodiments, the diversification service can retrieve recommendation sets containing complementary items identified in other ways, for example complementary items as specified by a seller of such items or as indicated by user-generated item groupings (e.g., wish lists, item collection lists, and the like). In other embodiments, the process 300 can be used to diversify other types of recommendation sets where the items are not complementary items to a source item. The recommended items can be ranked, for example based on relevance to a source item, a recommendations score based on user interest analysis, based on an inherent order of the recommended items list (e.g., bestsellers list), or any other ranking criteria. The recommended items can be pre-ranked or ranked by the diversified recommendation service 260.

Returning to the example discussed above with respect to the process 300, the ranked recommended related items can include a listing of items A, B, C, and D, where A is most relevant to the source item and D is least relevant to the source item. Using this example again in the discussion of process 400 will illustrate the differing orders that can be achieved based on differing diversity window size. This example will be discussed with respect to implementing process 400 with a diversity window size of three, however other diversity window sizes can be used in other implementations. Group size can be predetermined (for example, group size=three items) or can by dynamically determined to generate a diverse grouping to present in a display area of a known size.

At block 410, the diversified recommendation service 260 can identify a group containing the first item in the ranked recommendation set, and at least one item diverse to the first item and any other items in the group. Identifying the at least one diverse item can be done based on generation of overlap scores as described above with respect to blocks 325-350 of the process 300. In other embodiments, any of a variety of known methods for comparing item similarity, attributes, or content may be used to generate the overlap scores. For example, techniques from natural language processing such as simple inter-document term frequency or more complicated algorithms such as latent semantic analysis may be used. Also, pattern recognition techniques such as neural networks or Bayesian belief networks operating over the content feature space may be used. Considering the diverse item discussion above with respect to the process 300, item D can be identified as a first diverse item to item A, generating a group including items A and D. Because the diversity window size is set to three in this example, a third item will be found by the subsequent portions of process 400 that is diverse to both items A and D.

At block 415, the diversified recommendation service 260 can set the group to the next available positions in the display list. For example, a separately stored display list can include "A, D, _, _" while a reordered ranked list can include "A, D|B, C."

Blocks 420-440 represent one technique for determining a next item that is diverse to all items in the group based on overlap scores. Other similarity comparisons can be used instead of or in addition to blocks 420-440 in other implementations. At block 420, for each of N subsequent items in the ranked recommendation set, the diversified recommendation service 260 computes an overlap score with the group based on view-based similarity data and/or other item similarity data. This serves to identify a first item for a next group that is diverse generally to the whole group. For example, an overlap score can be generated for item B when compared with the group of items A and D based on retrieving a set of similar items associated with item A (for example, based on a number of items commonly viewed in a same browsing session as item A) and a set of similar items associated with item D and by generating an aggregate set of similar items including all items from the set associated with item A and the set associated with item D with duplicates removed. A set of similar items associated with item B can be compared with the aggregate set of similar items to determine a number of items in common between the set of similar items associated with item B and the aggregate set of similar items, and this number can be used to generate the overlap score.

In other embodiments, any of a variety of known methods for comparing item attributes or content may be used to generate the overlap scores. For example, techniques from natural language processing such as simple inter-document term frequency or more complicated algorithms such as latent semantic analysis may be used. Also, pattern recognition techniques such as neural networks or Bayesian belief networks operating over the content feature space may be used. The number N of subsequent items considered can be a user-defined parameter, can be a predetermined number based, for instance, on computing resource usage, or can be a dynamically determined number based, for example, on a number of remaining items in the recommendation set.

At block 425, the diversified recommendation service 260 uses the overlap scores to calculate a mean overlap score. When compared with the group of items A and D, overlap scores for items B and C can be 8 and 6, respectively, yielding a mean score of 7.

At decision block 430, the overlap score of each subsequent item in the ranked recommendation set is compared to the mean. This comparison can begin with the next item in the ranked recommendation set (e.g., the next most relevant item to the source item, in this example item B).

If the overlap score of the item is greater than the mean, this indicates that the item is likely similar to the current group, and the process 400 transitions to block 435 to examine the next item in the ranked recommendation set, looping back to decision block 430. Because the overlap score of item B (8) which is greater than the mean score (7), the process 400 will next consider item C. By sequentially scanning the ranked list, the diversified recommendation service 260 can diversify the recommended set while still substantially maintaining an order of items more relevant to less relevant to the source item.

If the overlap score of the item is less than or equal to than the mean, this indicates that the item is likely diverse to the current group, and the process 400 transitions to block 440. Since the overlap score of item C (6) is less than the mean (7), item C is likely diverse to the group of items A and D. At block 440, the diverse item is identified as the next item of the group. In the discussed example, the group now includes items A, D, and C.

At block 445 the diversified recommendation service 260 sets the identified diverse item to the next available display position. For example, a separately stored display list can include "A, D, C, _" while a reordered ranked list can include "A, D, C|B."

At decision block 450, the diversified recommendation service 260 determines whether positions remain in the display list. This can involve determining whether there are any items remaining that require re-ordering in the ranked recommendation set or whether there are any open slots in a separately stored display list. If no positions remain then the process 400 ends.

If positions remain, as in the discussed example, then the process 400 transitions to block 455 to redefine the group used for identifying a next diverse item to not include the first item in the group and to include the identified diverse item. Accordingly, the group considered for identifying the next diverse item is changed from items A and D to be items D and C. The process 400 then cycles back to block 415 to perform the similarity comparison using the newly defined group and continues until no positions remain in a separately stored display list or until the entire ranked list has been considered for reordering and is therefore finalized as the display list. As will be appreciated, the remaining spot will necessarily be filled by item B because it is the only item for consideration with the group of items D and C and therefore its overlap score will be equal to the mean. Accordingly, the display list in this example is finalized as "A, D, C, B."

Accordingly, the process 400 can be used to generate display lists of recommended items wherein groups of the recommended items contain items that are diverse to all other items in the group, and wherein a last item in the group is diverse to a first item in the next group. The group may be two or more items and, in some embodiments, group size may be determined based on a number of items that will fit within a recommended item display area such that all displayed recommended items are diverse to one another.

As described above, processes 300 and 400 can run offline for storing pre-generated lists in some embodiments, and in other embodiments can run online for dynamically generating lists based on user page requests, for example for generating diverse groupings based on display size for the display list.

The foregoing embodiments have been presented by way of illustration, and not limitation. Thus, nothing in the foregoing description is intended to imply that any particular feature, characteristic or step is essential to the invention. For example, although portions of this disclosure refer to a web site that provides online shopping functionality, the invention is not limited either to web site based implementations or to shopping systems.

The various components shown in FIG. 2, and the various processes described above (including those shown in FIGS. 3 and 5) may be implemented in a computing system via an appropriate combination of computerized machinery (hardware) and executable program code. For example, the catalog service 230, diversified recommendation service 260, item recommendation service 280, and other personalization services may each be implemented by one or more physical computing devices (e.g., servers) programmed with specific executable service code. Each such computing device typically includes one or more processors capable of executing instructions, and a memory capable of storing instructions and data. The executable code may be stored on any appropriate type or types of non-transitory computer storage or storage devices, such as magnetic disk drives and solid-state memory arrays. Some of the services and functions may alternatively be implemented in application-specific circuitry (e.g., ASICs or FPGAs). The various databases and data repositories 240, 250, 270 shown in FIG. 2 may be implemented using relational databases, flat file systems, tables, and/or other types of storage systems that use non-transitory storage devices (disk drives, solid state memories, etc.) to store data. Each such data repository may include multiple distinct databases. In a typical implementation, the recommendations provided to users, including the diversified complementary item recommendations presented by the item detail pages 100A, 100B, are based on an automated analysis of many recorded actions of a single user and/or millions of recorded actions of many thousands or millions of users. As explained above, the item detail pages 100A, 100B may, in some embodiments, be implemented partly or wholly in client-side application code that runs on users' computing devices.

Catalog service 230, diversified recommendation service 260, item recommendation service 280, portions thereof, and combinations thereof may be implemented by one or more servers 220. In other embodiments, any of the catalog service, 230, diversified recommendation service 260 and item recommendation service 280 may be implemented by one or more server machines distinct from the servers 220. In yet other embodiments, the interactive computing system 210, the servers 220, the catalog service 230, diversified recommendation service 260 and/or the item recommendation service 280 may be implemented by one more virtual machines implemented in a hosted computing environment. The hosted computing environment may include one or more rapidly provisioned and/or released computing resources. The computing resources may include hardware computing, networking and/or storage devices configures with specifically configured computer-executable instructions. A hosted computing environment may also be referred to as a cloud computing environment.

Further, the processing of the various components of the illustrated systems can be distributed across multiple machines, networks, and other computing resources. In addition, two or more components of a system can be combined into fewer components. For example, the various systems illustrated as part of the interactive computing system 210 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, “a processor configured to carry out recitations A, B and C” can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Appendix A

[0074] In one embodiment of a diversification technique, the overlap score between two items item1 and item2 is defined as:

Overlap score = (overlap count)/(view similarity count for item1 + view similarity count for item2 - overlap count)

where view similarity count for an item is the number of view-based similar items in a similar items set associated with the item and where the overlap count is the number of items that the similar item sets associated with item1 and item2 have in common.

[0075] View similarities is one preferred method of defining similarity between two items. Other methods of determining an overlap score can work equally well for the algorithm as described, for example attribute-based similarities.

[0076] Below is one example demonstrating this diversification technique using similar item examples as provided for Figures 1A-1C. However, the diversification technique can be applied to other items and their complementary item recommendations.

[0077] In the following description, M refers to memory cards and F refers to filters (for example color filters for photographic use). N can represent the length of the recommendations list (in this example, N =6). L can represent the number of ranked recommendations for which to calculate overlap scores (in this example, L = 4).

[0078] Consider the following example recommendations list: M1 M2 M3 F1 F2 F3.

[0079] Compute overlap score with respect to M1 for the next N=6 elements (or as many of 6 elements as remain in the list). For M1 : M2 M3 F1 F2 F3; overlap scores are 6, 5, 2, 1, 1, respectively for M2 M3 F1 F2 F3. Compute the average overlap score for the next N elements, and here average = 3.

[0080] Since M2's score (6) is more than the average score (3), M2 is similar to M1. The technique will find the next item from the next N elements that has an overlap score less than the average score.

[0081] F1 is the first such item (having overlap score=2). Therefore, move F1 to M2's position, yielding a re-ranked display list of M1 : F1 M2 M3 F2 F3 with overlap scores of 2, 6, 5, 1, 1, respectively for F1 M2 M3 F2 F3.

[0082] Now M1's next element has a score of 2, which is less than the average score.

[0083] Now compute the overlap score for the next N elements in the list with respect to F1. The listing M1 F1 : M2 M3 F2 F3 has overlap scores of 3, 2, 5, 6, respectively for M2 M3 F2 F3, yielding an average overlap score for the next N elements of 4.

[0084] Since M2's score (3) is less than the average computed, M2 is not similar to F1. Accordingly, no re-ranking of the next portion of the list is needed. The listing M1 F1 M2 : M3 F2 F3 has overlap scores of 6, 2, 1, respectively for M3 F2 F3, yielding an average overlap score for the next N elements of 3.

[0085] Since M3's score (6) is greater than the average score (3), this means M3 is similar to M2. The technique will find an item from the next N elements that has overlap score less than average. Here, F2's score is 2, so it is moved into M3's position.

[0086] The final diversified display list order is therefore: M1 F1 M2 F2 M3 F3.

Appendix B

[0087] In one embodiment of a diversification technique for generating diverse groups of items, the overlap score between itemx and a pair of items (itemy and itemz) is defined as:

Overlap score = (overlap count)/(view similarity count for itemx + unique view similarity count for item pair(itemy and itemz) - overlap count)

where view similarity count for an item is the number of view-based similar items in a similar items set associated with the item, and a unique similarity count for an item pair (item1 and item2) is total number of unique items in a combination of the similar item sets associated with item1 and item2, and where overlap count is the number of items that the similar item sets associated with the combined item1 and item2 similar items set and a similar item set associated with item3 have in common.

[0088] View similarities is the current method of defining similarity between two items, other methods of determining an overlap score would work equally well for the algorithm as described.

[0089] Below is an example demonstrating a technique for generating diverse groupings of items, M stands for memory cards, F stands for filters, and B stands for bag, following the example provided in Figures 1A-1C of complementary items for a camera. In the example below, let N = 8 for recommendations list length, and let L = 5 where L represents the number of ranked recommendations to process.

[0090] Consider the example recommendations list : M1 M2 M3 F1 F2 F3 B1 B2.

[0091] First, find diverse enough item for the first recommendations (M1). Compute overlap scores for the next N recommendations with respect to M1. For M1: M2 M3 F1 F2 F3 B1 B2; overlap scores are 5, 4, 2, 3, 2, 3, 2, respectively for M2 M3 F1 F2 F3 B1 B2, yielding an average overlap score for the next N elements of 3. Since M2's score (5) is greater than the average computed (3), this implies M2 is similar to M1.

[0092] Find an item from the next N elements that has overlap score less than the average computed. Here, F1's score (2) is the first overlap score less than the average, so F1 is moved to M2's position, yielding a new list order of M1: F1 M2 M3 F2 F3 B1 B2.

Overlap scores for F1 M2 M3 F2 F3 B1 B2 compared to M1 are, respectively, 2, 5, 4, 3, 2 , 3, 2. F1's score (2) is less than the average for the next N elements with respect to M1, and this implies F1 is diverse enough with respect to M1.

[0093] Now we have a pair (M1 and F1) that is diverse.

[0094] Next the technique can make a diverse triplet for the list M1 F1: M2 M3 F2 F3 B1 B2.

[0095] Compute overlap scores for each of the next N items with respect to M1 and F1 (the diverse pair). In this example, overlap scores for M2 M3 F2 F3 B1 B2 with respect to M1 and F1 are, respectively, 5, 7, 5, 4, 2, 1, yielding an average score of 4.

[0096] Since M2's score (5) is greater than the average computed, find the first item from the next N items that has score less than the average. Here, B1's score (2) is less than the average (4), so B1 is diverse enough with respect to M1 and F1 pair and is moved to M2's position yielding a new list order of M1 F1: B1 M2 M3 F2 F3 B2.

[0097] Now compute next diverse enough triplets; Compute over scores for the next N elements with respect to the F1 B1 pair. For the list M1 F1 B1 : M2 M3 F2 F3 B2, overlap scores are 2, 1, 4, 6, 7, respectively for M2 M3 F2 F3 B2 with respect to the F1 B1 pair, yielding an average overlap score of 4. M2's score (2) is less than the average (4), so the F1 B1 M2 triplet is diverse enough and the list order does not need to change.

[0098] Find the next diverse enough triplet. Compute overlap scores for the next N elements with respect to item pair B2 M3. For the list order M1 F1 B1 M2 : M3 F2 F3 B2, overlap scores are 5, 2, 1, 4, respectively, M3 F2 F3 B2 with respect to the B2 M3 item pair, yielding an average overlap score of 3.

[0099] Turning to the next item in the list, M3's score (5) is greater than the average. The process will find the first element from the next N elements which has overlap score less than the average. In this example, the first such item is F2 (with an overlap score of 2) so the B1 M2 F2 triplet is diverse enough. Move F2 to M3's position to yield a list order of M1 F1 B1 M2 F2 M3 F3 B2.

[0100] Find next the diverse enough triplet by computing overlap scores for the next N elements with respect to the M2 F2 pair. For the list M1 F1 B1 M2 F2 : M3

F3 B2, overlap scores are 6, 5, 1, respectively for M3 F3 B2 with respect to the M2 F2 pair, yielding an average score of 4.

[0101] Turning to the next item in the list, M3's score (6) is greater than the average. The process will sequentially analyze the remaining items to find the first item from the next N elements which has score less than the average computed. Here, the first such item is B2 with an overlap score of 1, so B2 is moved to M3's position yielding a new list order of M1 F1 B1 M2 F2 B2 M3 F3.

[0102] Now all the triplets are diverse enough so the final list order can be displayed to a user or stored for future display.

What is claimed is:

1. An interactive system comprising:

an electronic data store configured to at least store a catalog of items; and one or more servers in communication with the electronic data store, the one or more servers configured to at least:

generate a ranked list of items that are related to a source item, said ranked list of items based at least partly on purchase histories of a plurality of users of the catalog of items;

generate view-based similarity data for particular pairs of items based on item viewing histories of users;

dynamically determine a size of a diversity window based on parameters of a user device requesting a network page including a user interface for displaying a description of the source item; and generate, based at least partly on the ranked list of items and the view-based similarity data, a diversified item listing such that items of the same item type are not placed together within at least a portion of the diversified item listing corresponding to the size of the diversity window, wherein generating the diversified item listing comprises reordering at least the portion of the ranked item list based on the view-based similarity data; and generate, for presentation to the user on a user computing device, the network page including the description of the source item and the portion of the diversified item listing corresponding to the size of the diversity window.

2. The interactive system of claim 1, wherein generating the diversified item listing comprises reordering at least the portion of the ranked item list based on the view-based similarity data.

3. The interactive system of claim 1, wherein the one or more servers are configured to at least:

generate a plurality of diversified item listings corresponding to different diversity window sizes in advance of the user device requesting the network page; and store the plurality of diversified item listings in association with the source item.

4. The interactive system of claim 3, wherein the one or more servers are configured to at least, in response to the user device requesting the network page:

retrieve the diversified item listing based on the diversity window size; and generate the network page.

5. The interactive system of claim 1, wherein the view-based similarity data for a pair of items is a measure of similarity of items in the pairs based at least partly on how frequently both items of the pair are viewed within one of a common browsing session, predetermined number of viewing events, or predetermined time interval.

6. The interactive system of claim 5, wherein the one or more servers are configured to at least:

identify a first item in the ranked list; and generate overlap scores for each of N subsequent items in the ranked list based at least partly on the view-based similarity data, the overlap scores representing the measure of similarity of items in the pairs.

7. The interactive system of claim 6, wherein the one or more servers are configured to at least calculate a mean overlap score using the overlap scores for each of N subsequent items in the ranked list.

8. The interactive system of claim 7, wherein the one or more servers are configured to at least sequentially compare an overlap score associated with each of the N subsequent items in the ranked list to the mean overlap score until identifying a diverse item, the diverse item having an associated overlap score less than or equal to the mean overlap score.

9. The interactive system of claim 1, wherein the diversified item listing includes groups of items, wherein each item in a group is selected to be diverse to each other item in the group.

10. The interactive system of claim 9, wherein the one or more servers are configured to at least determine a number of items to include in the group based at least partly on a size of a recommended items display portion of the network page.

11. The interactive system of claim 1, wherein the parameters of the user device include one of a size of a display of the user device and a resolution of the display of the user device.

12. The interactive system of claim 1, wherein the parameters of the user device include a display area of a display of the user device display that will be used for presenting the portion of the diversified item listing.

13. The interactive system of claim 1, wherein the one or more servers are configured to at least generate the diversified item listing in response to the user device requesting the network page.

14. A non-transitory, computer-readable storage medium storing computer executable instructions that instruct one or more computing devices to perform operations comprising:

obtaining a ranked list of items;

retrieving item similarity data for at least some groups of two or more items of the ranked list of items;

dynamically determining a size of a diversity window based on parameters of a user device requesting a display page including a user interface for displaying a representation of at least a portion of the ranked list of items;

reordering at least the portion of the ranked list of items based on the item similarity data, to thereby provide a reordered list in which items of the same item type are not positioned together in groupings of items corresponding to the size of the diversity window; and incorporating the first list portion of the reordered list into the display page for presentation to a user.

15. A method of generating a diversified listing of items that are related to a first item, the method comprising:

generating a ranked list of items that are purchased in combination with the first item, said ranked list of items based on purchase histories of a plurality of users of an electronic catalog system;

generating similarity data for particular pairs of items based on item viewing histories of users;

dynamically determining a size of a diversity window based on parameters of a user device requesting a network page including a user interface for displaying the first item; and reordering the ranked list of items based at least partly on the similarity data such that items of the same item type that are viewed relatively frequently during a common browsing session are not placed within a number of positions of each other in the reordered list corresponding to the size of the diversity window;

said method performed programmatically by a computing system that comprises one or more computing devices.

16. The method of claim 15, wherein the similarity data is generated based at least partly on correlating a first set of items associated with the first item in a particular pair with a second set of items associated with a second item in the particular pair.

17. The method of claim 16, wherein first set of items associated with the first item represents items commonly viewed during a same browsing session as the first item, and wherein the second set of items associated with the second item represents items commonly viewed during a same browsing session as the second item.

18. The method of claim 15, wherein the similarity data is generated based at least partly on correlating item attributes of a first item in a particular pair with item attributes of a second item in the particular pair.

19. The non-transitory, computer-readable storage medium of claim 14, wherein the diversity window operates as a sliding window to generate overlapping diverse item groupings through a length of the ranked list of items.

20. The non-transitory, computer-readable storage medium of claim 14, wherein the item similarity is based at least partly on an automated analysis of item viewing histories of users.

21. The non-transitory, computer-readable storage medium of claim 14, wherein the item similarity is based at least partly on an automated comparison of item attributes.

22. The non-transitory, computer-readable storage medium of claim 14, wherein the reordering comprises using the item similarity data to generate overlap scores for pairs of adjacent items in the ranked list.

23. The non-transitory, computer-readable storage medium of claim 14, wherein the ranked list is a search results listing.

24. The non-transitory, computer-readable storage medium of claim 14, wherein the ranked list is a list of items that are related to a source item.

* * * * *